(12) United States Patent
Fuller et al.

(10) Patent No.: US 9,040,596 B2
(45) Date of Patent: May 26, 2015

(54) ORGANO-COPPER REAGENTS FOR ATTACHING PERFLUOROSULFONIC ACID GROUPS TO POLYOLEFINS

(75) Inventors: Timothy J. Fuller, Pittsford, NY (US); Lijun Zou, Rochester, NY (US); Michael R. Schoeneweiss, West Henrietta, NY (US)

(73) Assignee: GM Global Technology Operations LLC, Dearborn, MI (US)

( * ) Notice: Subject to any disclaimer, the term of this patent is extended or adjusted under 35 U.S.C. 154(b) by 818 days.

(21) Appl. No.: 13/338,769

(22) Filed: Dec. 28, 2011

(65) Prior Publication Data
US 2013/0171528 A1    Jul. 4, 2013

(51) Int. Cl.
| | | |
|---|---|---|
| B01D 71/82 | (2006.01) | |
| C08F 112/06 | (2006.01) | |
| C08F 114/06 | (2006.01) | |
| H01M 8/00 | (2006.01) | |
| C08F 114/16 | (2006.01) | |
| C08J 5/22 | (2006.01) | |
| H01M 8/10 | (2006.01) | |
| C08F 8/22 | (2006.01) | |

(52) U.S. Cl.
CPC ............... *B01D 71/82* (2013.01); *Y02E 60/521* (2013.01); *C08F 112/06* (2013.01); *C08F 114/16* (2013.01); *C08J 5/22* (2013.01); *H01M 8/10* (2013.01); *C08F 8/22* (2013.01); *H01M 8/1023* (2013.01); *C08J 5/2231* (2013.01); *C08J 2323/08* (2013.01)

(58) Field of Classification Search
CPC ..... B08D 71/82; C08F 112/06; C08F 114/06; H01M 8/10
USPC ............. 521/33; 429/408; 525/200; 526/242, 526/243
See application file for complete search history.

(56) References Cited

U.S. PATENT DOCUMENTS

| | | | |
|---|---|---|---|
| 4,764,446 A | 8/1988 | Croucher et al. | |
| 4,952,477 A | 8/1990 | Fuller et al. | |
| 4,990,424 A | 2/1991 | Van Dusen et al. | |
| 5,030,535 A | 7/1991 | Drappel et al. | |
| 5,166,026 A | 11/1992 | Fuller et al. | |
| 5,409,796 A | 4/1995 | Fuller et al. | |
| 5,411,834 A | 5/1995 | Fuller et al. | |
| 5,451,483 A | 9/1995 | Fuller et al. | |
| 7,897,691 B2 | 3/2011 | MacKinnon et al. | |
| 2009/0281245 A1* | 11/2009 | MacKinnon et al. | ......... 525/200 |

FOREIGN PATENT DOCUMENTS

DE     10 2009 020 231 A1    2/2010

* cited by examiner

*Primary Examiner* — Michael M Bernshteyn
(74) *Attorney, Agent, or Firm* — Brooks Kushman P.C.

(57) ABSTRACT

An ion conducting membrane for fuel cells involves coupling a compound having a sulfonic acid group with a polymeric backbone. Each of the compounds having a sulfonic acid group and the polymeric backbone are first functionalized with a halogen.

9 Claims, 8 Drawing Sheets

ORGANO-COPPER REAGENTS FOR ATTACHING PERFLUOROSULFONIC ACID GROUPS TO POLYOLEFINS

TECHNICAL FIELD

The field to which the disclosure generally relates is to methods for making polymeric electrolytes and to fuel cells incorporating such electrolytes.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode while also serving as an electrical insulator.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell. Typically, the ion conductive polymer membrane includes a perfluorosulfonic acid (PFSA) ionomer.

The MEA is sandwiched between a pair of porous gas diffusion layers ("GDL"), which in turn are sandwiched between a pair of electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

Polymer electrolytes play an important part in determining the efficiency of PEM fuel cells. To achieve optimal performance, the polymer electrolyte must maintain a high ionic conductivity and mechanical stability at both high and low relative humidity. The polymer electrolyte also needs to have excellent chemical stability for long product life and robustness. Polymeric electrolytes having perfluorosulfonic acid groups are under active development for fuel cell applications.

At present, the coupling of perfluorosulfonic acid groups to polymeric backbones is limited to halogenated aromatic polymers, i.e., those with phenyl-Br or —I moieties and is restricted to coupling with I—$CF_2CF_2OCF_2CF_2SO_3^-K^+$ using metallic copper. The use of organocuprate reagents expands the scope of the coupling reactions to include more aliphatic containing polymers. Presently, halogenated-aromatic polymers are allowed to react with metallic copper and then are allowed to react with I—$CF_2CF_2OCF_2CF_2SO_3^-K^+$ to form polyolefins with perfluorosulfonic acid side groups. An alternative route involves the addition of metallic copper to I—$CF_2CF_2OCF_2CF_2SO_3^-K^+$ in solution, followed by the addition of the halogenated-polymer in solution. The other alternatives are expensive commercially available PFSAs.

Accordingly, an improved method of making polymeric electrolytes is needed, and in particular, to methods of making such electrolytes with perfluorosulfonic acid side groups.

SUMMARY OF THE INVENTION

The present invention solves one or more problems of the prior art by providing in at least one embodiment a method of forming an ion conducting polymeric membrane for fuel cells. The method comprises reacting a polymer having formula 1 with a compound having formula 2:

(1)

(2)

in the presence of an organocuprate compound to form a polymer having formula (3):

(3)

wherein:
  $X_1$, $X_2$ are each independently a halogen;
  $R_1$, $R_2$, and $R_3$ are each independently hydrogen or $C_1$-$C_6$ alkyl;
  $R_4$, $R_5$ are each independently phenyl, $C_1$-$C_{12}$ alkyl, $C_1$-$C_{12}$ alkyl ether, $C_1$-$C_{12}$ fluoroalkyl, $C_1$-$C_{12}$ fluoroalkyl ether, $C_7$-$C_{30}$ arylalkyl, $C_7$-$C_{30}$ phenylalkyl, $C_7$-$C_{12}$ aryl, —$(CH_2)_r$—, or —$(CF_2)_p$—O—$(CF_2)_q$—;
  Z is hydrogen or a metal (e.g., sodium, potassium, etc.)
  n is a number from 10 to 500; and
  p, q, r are each independently an integer from 2 to 10.
An ion conducting membrane is formed from the polymer having formula (3).

In another embodiment, a method of forming an ion conducting polymeric membrane for fuel cells is provided. The method comprises reacting a compound having formula 4 with a compound having formula 5:

(4)

(5)

in the presence of an organocuprate compound to form a compound having formula 6:

$$R_7\text{—}O\text{—}R_6\text{—}R_5\text{—}SO_2Z \quad (6)$$

The compound having formula 6 is converted to a compound having formula 7:

$$\overset{\oplus}{M} \quad \overset{\ominus}{O}\text{—}R_6\text{—}R_5\text{—}SO_2Z \quad (7)$$

The compound having formula 7 is reacted with a compound having formula 8 to form a polymer having formula 9:

wherein:
$X_1, X_2, X_3$ are each independently a halogen;
$R_1, R_2$, and $R_3$ are each independently hydrogen or $C_1\text{-}C_6$ alkyl;
$R_4, R_5$ are each independently phenyl, $C_1\text{-}C_{12}$ alkyl, $C_1\text{-}C_{12}$ alkyl ether, $C_1\text{-}C_{12}$ fluoroalkyl, $C_1\text{-}C_{12}$ fluoroalkyl ether, $C_7\text{-}C_{30}$ arylalkyl, $C_7\text{-}C_{30}$ phenylalkyl, $C_7\text{-}C_{12}$ aryl, $\text{—}(CH_2)_r\text{—}$, or $\text{—}(CF_2)_p\text{—}O\text{—}(CF_2)_q\text{—}$;
$R_6$ is phenyl, $C_1\text{-}C_{12}$ alkyl, $C_1\text{-}C_{12}$ alkyl ether, $C_1\text{-}C_{12}$ fluoroalkyl, $C_1\text{-}C_{12}$ fluoroalkyl ether, $C_7\text{-}C_{30}$ arylalkyl, $C_7\text{-}C_{30}$ phenylalkyl, $C_7\text{-}C_{12}$ aryl, or $\text{—}(CF_2)_p\text{—}O\text{—}(CF_2)_q\text{—}$;
Z is hydrogen or a metal (e.g., sodium, potassium, etc.)
n is a number from 10 to 500; and
p, q, r are each independently an integer from 2 to 10.
An ion conducting membrane is formed from the polymer having formula 9.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
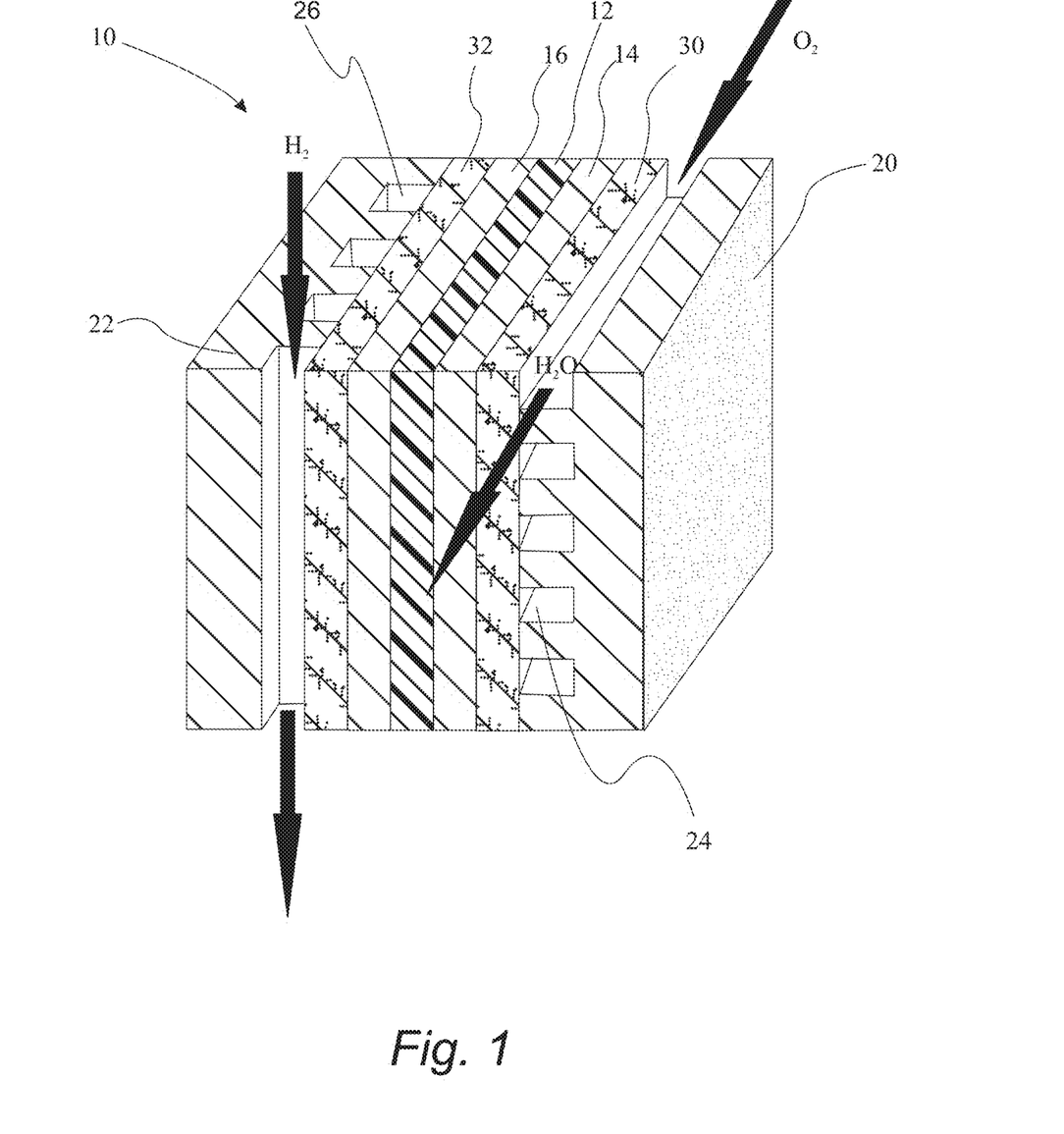
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 24 and 26, and gas diffusion layers 30 and 32.

In an embodiment, a method of forming an ion conducting polymeric membrane for fuel cells is provided. The method comprises reacting a polymer having formula 1 with a compound having formula 2:

(1)

$$X_2\text{—}R_5\text{—}SO_3Z \quad (2)$$

in the presence of an organocuprate compound to form a polymer having formula (3):

(3)

wherein:
X$_1$, X$_2$, X$_3$ are each independently a halogen;
R$_1$, R$_2$, and R$_3$ are each independently hydrogen or C$_1$-C$_6$ alkyl;
R$_4$, R$_5$ are each independently phenyl, C$_1$-C$_{12}$ alkyl, C$_1$-C$_{12}$ alkyl ether, C$_1$-C$_{12}$ fluoroalkyl, C$_1$-C$_{12}$ fluoroalkyl ether, C$_7$-C$_{30}$ arylalkyl, C$_7$-C$_{30}$ phenylalkyl, C$_7$-C$_{12}$ aryl, —(CH$_2$)$_r$—, or —(CF$_2$)$_p$—O—(CF$_2$)$_q$—;
Z is hydrogen or a metal (e.g., sodium, potassium, etc.);
n is a number from 10 to 500;
p is an integer from 2 to 10; and
q is an integer from 2 to 20.

Figure 2:
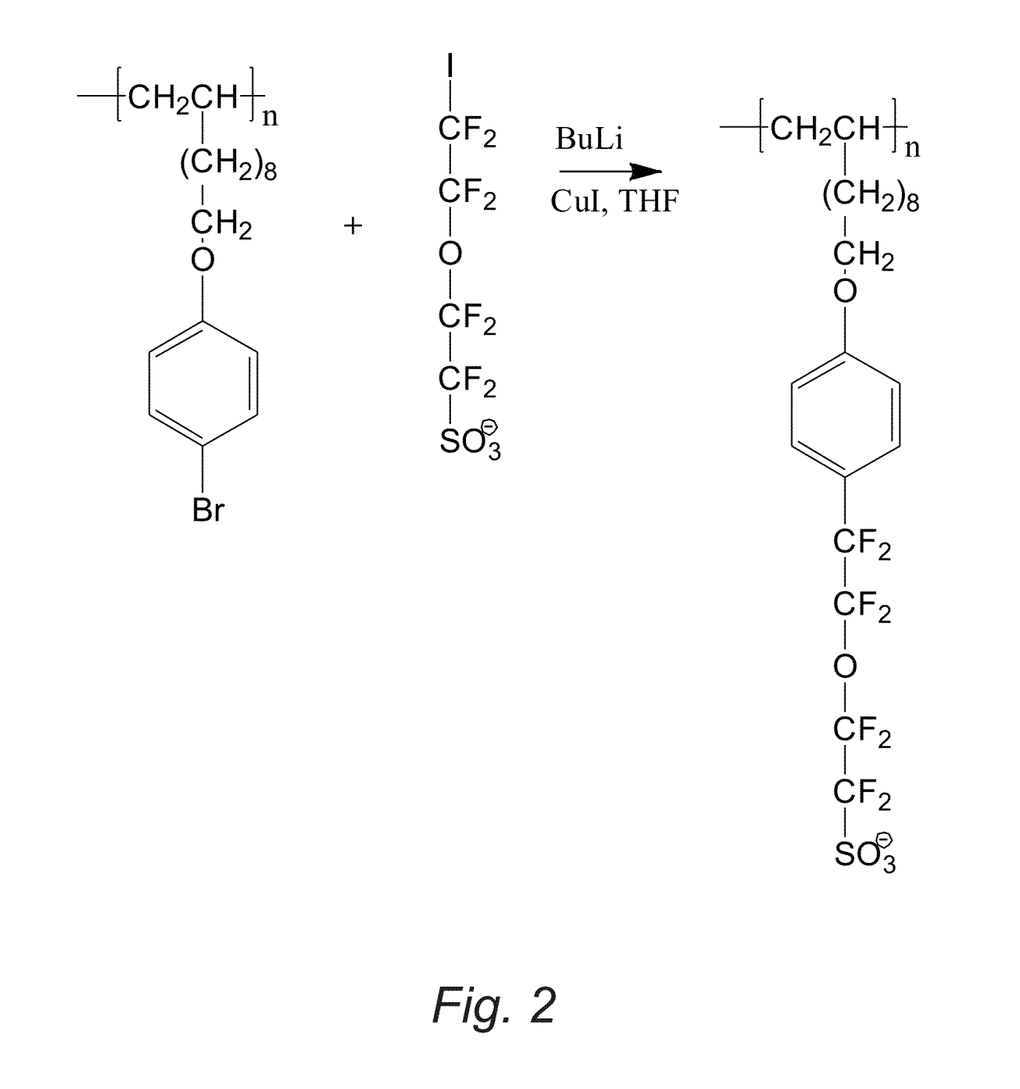
FIG. 2 provides a synthetic scheme for preparing the ion conducting polymers of the present invention.

The chemical reactions leading to formula 3 are typically performed in an aprotic solvent such as tetrahydrofuran (THF), diethyl ether, and the like. An ion conducting membrane is formed from the polymer having formula (3). FIG. 2 provides a synthetic scheme illustrating the method of this embodiment.

As set forth above, X$_1$, X$_2$ are each independently a halogen. In particular, X$_1$, X$_2$ are bromine or iodine.

In a variation of the present embodiment, the organocuprate compound is formed via the reaction of alkyl lithium with copper (I) iodide via the following synthetic scheme:

wherein R is C$_1$-C$_{12}$ alkyl (e.g., methyl, ethyl, propyl, butyl etc.). Moreover, organo-copper reagents are implicated in the CuI coupling reaction between compounds such as C$_6$H$_5$MgX (where X=Cl, Br, or I) (Gringard reactant) and alkyl halides (R—X, where X=Br or I).

In a refinement of the present invention, R$_1$, R$_2$, and R$_3$ are each independently hydrogen, methyl, ethyl, propyl, or butyl. In another refinement, R$_4$ is v is an integer from 0 to 12, and w is an integer from 0 to 12. In still another refinement, R$_5$ is —(CF$_2$)$_p$—O—(CF$_2$)$_q$—. In yet another refinement, R$_5$ is —CF$_2$CF$_2$—O—CF$_2$CF$_2$—.

The polymer having formula 3 may be formed into an ion conducting membrane by any method known to one of ordinary skill in the art. The membrane may be formed, for example, by melt casting, spin coating, solution casting, extrusion casting, calendaring, spray coating, blow molding, fixed gap coating, hot pressing and the like. The thickness of the film may be from a few micrometers to about 200 micrometers.

In a variation of the present embodiment, the method further comprises positioning the membrane between an anode layer and a cathode layer to form a membrane electrode assembly that is subsequently positioned between a pair of bipolar plates and a pair of gas diffusion layers to form a fuel cell in accordance with FIG. 1.

In another embodiment, a method of forming an ion conducting polymeric membrane for fuel cells is provided. The method comprises reacting a compound having formula 4 with a compound having formula 5:

in the presence of an organocuprate compound to form a compound having formula 6:

The compound having formula 6 is converted to a compound having formula 7:

(7)

Figure 3:
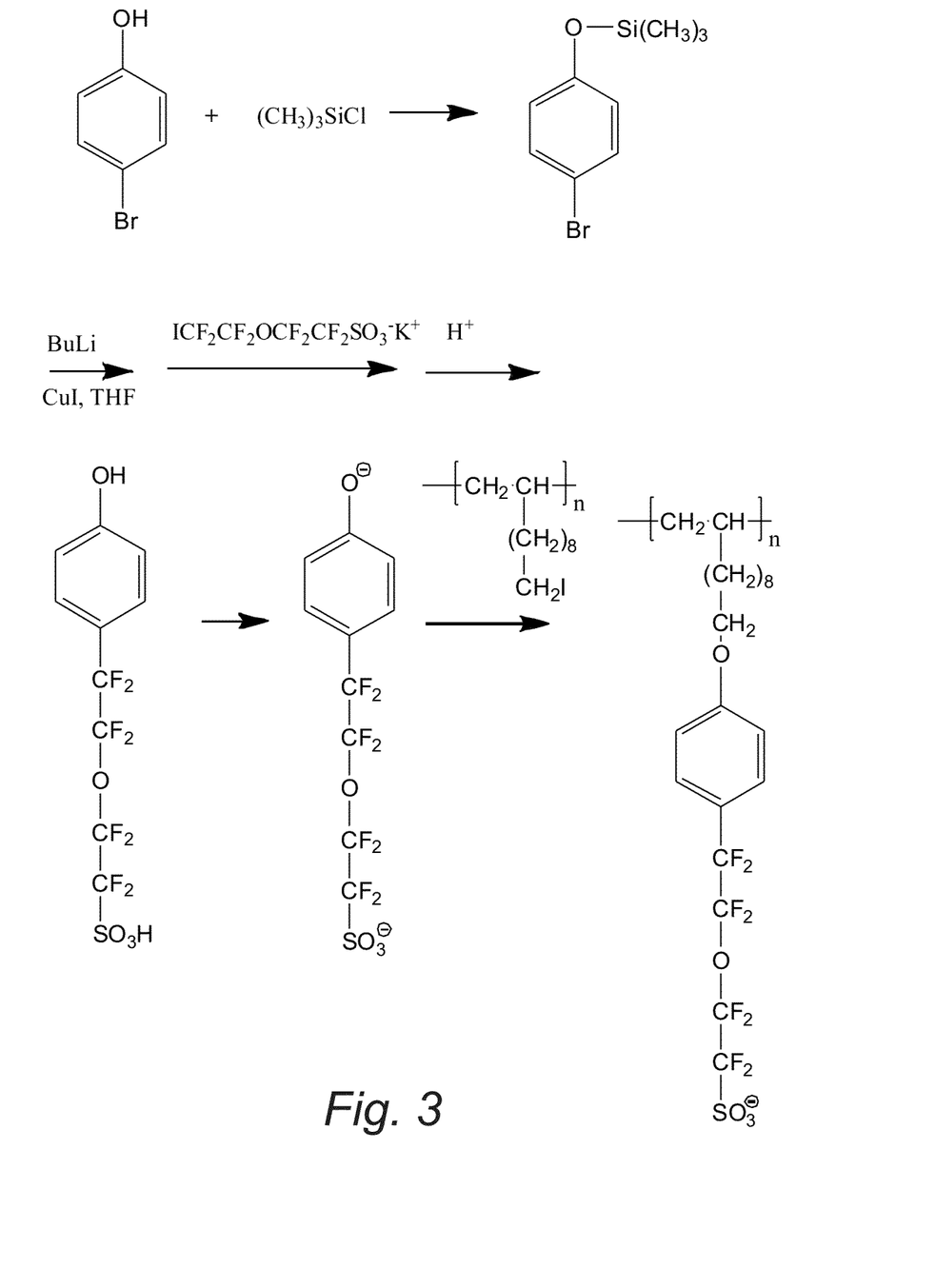
FIG. 3 provides a synthetic scheme for preparing the ion conducting polymers of the present invention.

In a refinement, this conversion involves removing the protecting group $R_7$ typically with an acid or base workup followed by treatment with a strong base to form compound 7. The compound having formula 7 is reacted with a compound having formula 8 to form a polymer having formula 9:

wherein:
$X_1$, $X_2$, $X_3$ are each independently a halogen;
$R_1$, $R_2$, and $R_3$ are each independently hydrogen or $C_1$-$C_6$ alkyl;
$R_4$, $R_5$ are each independently phenyl, $C_1$-$C_{12}$ alkyl, $C_1$-$C_{12}$ alkyl ether, $C_1$-$C_{12}$ fluoroalkyl, $C_1$-$C_{12}$ fluoroalkyl ether, $C_7$-$C_{30}$ arylalkyl, $C_7$-$C_{30}$ phenylalkyl, $C_7$-$C_{12}$ aryl, —$(CH_2)_r$—, or —$(CF_2)_p$—O—$(CF_2)_q$—;
$R_6$ is phenyl, $C_1$-$C_{12}$ alkyl, $C_1$-$C_{12}$ alkyl ether, $C_1$-$C_{12}$ fluoroalkyl, $C_1$-$C_{12}$ fluoroalkyl ether, $C_7$-$C_{30}$ arylalkyl, $C_7$-$C_{30}$ phenylalkyl, $C_7$-$C_{12}$ aryl, or —$(CF_2)_p$—O—$(CF_2)_q$—;
Z is hydrogen or a metal (e.g., sodium, potassium, etc.)
n is a number from 10 to 500; and
p, q, r are each independently an integer from 2 to 10.
The chemical reactions leading to formula 9 are typically performed in an aprotic solvent such as tetrahydrofuran (THF), diethyl ether, and the like. An ion conducting membrane is formed from the polymer having formula 9. FIG. 3 provides a synthetic scheme illustrating the method of this embodiment.

In a variation of the present embodiment, the organocuprate compound is formed via the reaction of alkyl lithium with copper (I) iodide via the following synthetic scheme:

wherein R is $C_1$-$C_{12}$ alkyl (e.g., methyl, ethyl, propyl, butyl etc.).
As set forth above, $X_1$, $X_2$, $X_3$ are each independently a halogen. In particular, $X_1$, $X_2$, $X_3$ are bromine or iodine.

In a refinement of the present invention, $R_1$, $R_2$, and $R_3$ are each independently hydrogen, methyl, ethyl, propyl, or butyl. In another refinement, $R_4$ and $R_6$ are each independently:

v is an integer from 0 to 12, and w is an integer from 0 to 12. In still another refinement, $R_5$ is —$(CF_2)_p$—O—$(CF_2)_q$. In yet another refinement, $R_5$ is —$CF_2CF_2$—O—$CF_2CF_2$—.

The polymer having formula 9 may be formed into an ion conducting membrane by any method known to one of ordinary skill in the art. The membrane may be formed, for example, by melt casting, spin coating, solution casting, extrusion casting, calendaring, spray coating, blow molding, fixed gap coating, hot pressing and the like. The thickness of the film may be from a few micrometers to about 200 micrometers.

In a variation of the present embodiment, the method of further comprises positioning the membrane between an anode layer and a cathode layer to form a membrane electrode assembly that is subsequently positioned between a pair of bipolar plates and a pair of gas diffusion layers to form a fuel cell in accordance with FIG. 1.

The following examples illustrate the various embodiments of the present invention. Those skilled in the art will recognize many variations that are within the spirit of the present invention and scope of the claims.

Preparation of p-BrC$_6$H$_4$O—CH$_2$(CH$_2$)$_8$CH═CH$_2$ from the Reaction of p-Bromophenol with 11-Undecylenyl Bromide A 250-mL Schlenk flask with a magnetic stir bar and nitrogen inlet is charged with p-bromophenol (1 g, 0.00578 mol, from Sigma-Aldrich and purified by sublimation) dissolved in tetrahydrofuran (40 mL, freshly distilled from sodium benzophenone ketyl). Sodium hydride (1.61 g of a 50 weight percent dispersion in oil, Sigma-Aldrich) is added with vigorous hydrogen gas evolution. A catalytic amount of 18-crown-6 (0.05 g) is added, and then a solution of 11-undecylenyl bromide (2.02 g, 0.0086755 mol, used as-received from Acros) in 10 mL of freshly distilled tetrahydrofuran is added. The reaction mixture is magnetically stirred under nitrogen for 3 days and then, after equipping the flask with a reflux condenser, the mixture is refluxed for 24 hours. The reaction mixture at 23° C. is then pressure filtered under nitrogen through a 0.5-micron Teflon filter (Millipore, LSWP 47 mm). The solids are cautiously treated with isopropanol to neutralize the unreacted sodium hydride, and the solvent is removed from the filtrate to yield a residue which is analyzed by gas chromatography and mass spectrometry. The ratio of peak heights is 7 (undecylenyl bromide): 2 (p-bromophenol): 1 [p-BrC$_6$H$_4$O—CH$_2$(CH$_2$)$_8$CH═CH$_2$]. Aqueous 1M sodium hydroxide is added to the residue and then extracted with methylene chloride. After drying, the methylene chloride fractions with sodium sulfate and washing the salt with methylene chloride, the combined fractions are evaporated and vacuum distilled (using a Kugelrohr distillation apparatus and a Welch model 1602 oil vacuum pump). The residual undecylenyl bromide is the first fraction (115° C.), and the residue is [p-BrC$_6$H$_4$O—CH$_2$(CH$_2$)$_8$CH=CH$_2$], which distills over at 150° C. and above.

No Reaction Between Sodium p-Bromophenonoxide with ICF$_2$CF$_2$OCF$_2$CF$_2$SO$_3$$^-$K$^+$ in Tetrahydrofuran A 250-mL Schlenk flask with a magnetic stir bar and nitrogen inlet is charged with p-bromophenol (1 g, 0.00578 mol, from Sigma-Aldrich and purified by sublimation) that is dissolved in tetrahydrofuran (40 mL, freshly distilled from sodium benzophenone ketyl). Sodium hydride (1.61 g of a 50 weight percent dispersion in oil, Sigma-Aldrich) is added with vigorous hydrogen gas evolution. A catalytic amount of 18-crown-6 (0.05 g) is added, and then a solution of ICF$_2$CF$_2$OCF$_2$CF$_2$SO$_3$$^-$K$^+$ (2.77 g) in 30 mL of freshly distilled tetrahydrofuran is added. The reaction mixture is magnetically stirred under nitrogen for 3 days and then, after equipping the flask with a reflux condenser, the mixture is refluxed for 24 hours. The reaction mixture at 23° C. is then pressure filtered under nitrogen through a 0.5-micron Teflon filter (Millipore, LSWP 47 mm). The solids are cautiously treated with isopropanol to neutralize the unreacted sodium hydride, and the solvent is removed from the filtrate to yield a residue which is analyzed by liquid chromatography and mass spectrometry. The tetrahydrofuran-soluble portion of the residue consists of a mixture with the following peak height ratios: 2.5 (ICF$_2$CF$_2$OCF$_2$CF$_2$SO$_3$$^-$K$^+$): 1 (p-bromophenoxide). Thus, there is no evidence for the reaction of ICF$_2$CF$_2$OCF$_2$CF$_2$SO$_3$$^-$K$^+$ with sodium p-bromophenoxide in THF under the conditions tried. However, there is some evidence for the reaction proceeding at 130° C. in DMF (see below).

No Reaction Between Sodium 11-Undecylenyloxide with ICF$_2$CF$_2$OCF$_2$CF$_2$SO$_3$$^-$K$^+$ A 250-mL Schlenk flask with a magnetic stir bar and nitrogen inlet is charged with undecylenyl alcohol (0.945 g, Sigma-Aldrich) that is dissolved in tetrahydrofuran (40 mL, freshly distilled from sodium benzophenone ketyl). Sodium hydride (1 g of a 50 weight percent dispersion in oil, Sigma-Aldrich) is added with vigorous hydrogen gas evolution. A catalytic amount of 18-crown-6 (0.05 g) is added, and then a solution of ICF$_2$CF$_2$OCF$_2$CF$_2$SO$_3$$^-$K$^+$ (2.79 g) is added. The reaction mixture is magnetically stirred under nitrogen for 3 days and then, after equipping the flask with a reflux condenser, the mixture is refluxed for 24 hours. The reaction mixture at 23° C. is then pressure filtered under nitrogen through a 0.5-micron Teflon filter (Millipore, LSWP 47 mm). The solids are cautiously treated with isopropanol to neutralize the unreacted sodium hydride, and the solvent is removed from the filtrate to yield a residue which is analyzed by liquid chromatography and mass spectrometry. There was evidence for the reaction product CH$_2$=CH—(CH$_2$)$_8$—CH$_2$—OCF$_2$CF$_2$OCF$_2$CF$_2$SO$_3$$^-$K$^+$.

Reaction of p-BrC$_6$H$_5$OSi(CH$_3$)$_3$, n-Butyllithium, and CuI, with ICF$_2$CF$_2$OCF$_2$CF$_2$SO$_3$$^-$K$^+$ Present A 250-mL Schlenk flask, equipped with a magnetic stir bar, rubber septum, and a nitrogen inlet, is charged with tetrahydrofuran (40 mL, freshly distilled from sodium benzophenone ketyl). Via a syringe, p-BrC$_6$H$_5$OSi(CH$_3$)$_3$ (1 g) is added, and the solution is cooled to −30° C. While at −30° C., 1.6 M n-butyllithium (2.55 mL) is added with a syringe and the solution becomes yellow. After 1 hour at −30° C., copper iodide (0.77 g, mostly insoluble and suspended in 5 mL tetrahydrofuran) is added via syringe and a large gauge needle, and the reaction mixture immediately becomes black. The reaction mixture is maintained at −30° C. while ICF$_2$CF$_2$OCF$_2$CF$_2$SO$_3$$^-$K$^+$ (2.79 g) in tetrahydrofuran (40 mL) is added via a syringe with magnetic stirring. The reaction mixture is allowed to warm to 23° C. with continued stirring for 24 hours. A small amount of methanol is then added with a syringe, and the reaction mixture is then treated with concentrated hydrochloric acid (1 mL). The solvent is removed using a rotary evaporator to yield a residue which is analyzed by liquid chromatography and mass spectrometry. Fraction 1 is a sample of the tetrahydrofuran soluble portion of the residue and consists mostly of ICF$_2$CF$_2$OCF$_2$CF$_2$SO$_3$$^-$. Fraction 2 is an oily toluene soluble extract of the residue which consists of BrC$_6$H$_4$O$^-$, ICF$_2$CF$_2$OCF$_2$CF$_2$SO$_3$$^-$, IC$_6$H$_4$O$^-$, in a peak ratio of 1:1.7:1. Fraction 3 is a water soluble extract of the residue which consists of ICF$_2$CF$_2$OCF$_2$CF$_2$SO$_3$$^-$ and HCF$_2$CF$_2$OCF$_2$CF$_2$SO$_3$$^-$ with no uv-visible chromophore. Fraction 4 is a methylene chloride extract of the residue which consists of ICF$_2$CF$_2$OCF$_2$CF$_2$SO$_3$$^-$ and HCF$_2$CF$_2$OCF$_2$CF$_2$SO$_3$$^-$ with no uv-visible chromophore. Thus, there is no evidence for the presence of HO—C$_6$H$_4$—CF$_2$CF$_2$OCF$_2$CF$_2$SO$_3$H formed by a copper mediated coupling reaction under these reaction conditions. Noteworthy is the observation that fractions 3 and 4 can be used to suggest that L$_1$-C$_6$H$_5$OSi(CH$_3$)$_3$ (formed by the expected metal halogen exchange reaction between p-BrC$_6$H$_5$OSi(CH$_3$)$_3$ and n-butyllithium) can further metal halogen exchange with ICF$_2$CF$_2$OCF$_2$CF$_2$SO$_3$$^-$K$^+$ to form I—C$_6$H$_5$OSi(CH$_3$)$_3$ and Li—CF$_2$CF$_2$OCF$_2$CF$_2$SO$_3$$^-$K, which when acidified form I—C$_6$H$_5$OH and with H—CF$_2$CF$_2$OCF$_2$CF$_2$SO$_3$$^-$K, respectively.

Preparation of p-BrC$_6$H$_5$OSi(CH$_3$)$_3$

To a 250-mL, three-necked flask equipped with a mechanical stirrer, an addition funnel and a reflux condenser under argon is added tetrahydrofuran (50 mL), pyridine (6 mL, 5.88 g), and 4-bromophenol (9.74 g). Chlorotrimethylsilane (9.3 mL) is then added drop-wise. The mixture is allowed to stir for 72 hours, and the product, p-BrC$_6$H$_5$OSi(CH$_3$)$_3$, is obtained as a colorless oil by filtering off pyridinium hydrochloride (as white crystals) using a Millipore high-pressure filter (LSWP, 47 mm, 5-micron Teflon filter) under nitrogen, then solvent removal from the filtrate using a rotary evaporator, and then vacuum distillation (using a Welch model 1602, oil vacuum pump).

Preparation of HO—C$_6$H$_4$—CF$_2$CF$_2$OCF$_2$CF$_2$SO$_3$$^-$K by the Ullmann Copper Coupling Reaction of p-BrC$_6$H$_5$OSi(CH$_3$)$_3$ and ICF$_2$CF$_2$OCF$_2$CF$_2$SO$_3$$^-$K$^+$ Copper and ICF$_2$CF$_2$OCF$_2$CF$_2$SO$_3$$^-$K$^+$ are dried under vacuum at 60° C. before use. A 250-mL Schlenk flask, situated in an oil bath and equipped with a side arm, a mechanical stirrer, a rubber septum on the stopcock/gas inlet of the flask, a reflux condenser, and a nitrogen inlet, is charged with p-BrC$_6$H$_5$OSi(CH$_3$)$_3$ (5 g), dimethyl sulfoxide (4 g, stored over 4 Å-molecular sieves), N,N-dimethylformamide (20 g, stored over 4 Å-molecular sieves), and copper powder (10.83 g, 45-micrometer particles, Acros 196575000). The stirred mixture is heated in an oil bath set at 130° C. and stirred for 1 hour. Potassium tetrafluoro-2-(tetrafluoro-2-iodoethoxy)ethanesulfonate (10.37 g) dissolved in N,N-dimethylformamide (20 g) is then added drop-wise (at a rate of one drop every 3 to six seconds). Stirring under argon in the 130° C. oil bath is continued for 18 hours. The mixture is allowed to settle at 23° C., and the solvent layer is pressure-filtered through a 5-micrometer Mitex® filter. The filtrate is added to 50 mL of 10% hydrochloric acid (prepared by adding 5 mL of concentrated HCl to 45 mL of deioinzed water). The mixture is stirred 16 hours at 23° C., and then the solvents are removed under vacuum with a rotary evaporator. The black oily residue is soluble in methanol, tetrahydrofuran, methylene chloride and toluene, but is insoluble in hexanes. The composition of the residue is analyzed using liquid chromatography and mass spectroscopy. The following ratios of peak heights are determined: 2.2 ($HCF_2CF_2OCF_2CF_2SO_3^-K^+$): 1.7 ($ICF_2CF_2OCF_2CF_2SO_3^-K^+$): 1.8 ($HO—C_6H_4—CF_2CF_2OCF_2CF_2SO_3^-K^+$): 1 ($BrC_6H_4O—CF_2CF_2OCF_2CF_2SO_3^-K^+$). The oily residue is chromatographed on silica eluting with mixtures of hexanes (H) and tetrahydrofuran (THF) starting with a 10 (H): 1 (THF) ratio, and then by gradually increasing the tetrahydrofuran component to 5 (H): 1 (THF), then 5(H): 2 (THF), then 1 (H): 1 (THF) and then all THF. Elution volumes of 25 mL are collected and taken to dryness. Black, oily crystals are found in the middle fractions collected with 2 (H): 1 (THF). Attempts to further purify and isolate the products by recrystallization from methanol, toluene and mixtures thereof in a freezer are unsuccessful, as is recrystallization from methanol and water. Chromatography with hexanes: ethyl acetate on silica is attempted with middle fractions after drying consisting mostly of $HO—C_6H_4—CF_2CF_2OCF_2CF_2SO_3^-K^+$ with some $ICF_2CF_2OCF_2CF_2SO_3^-K'$ and $HCF_2CF_2OCF_2CF_2SO_3^-K'$ contamination. Similar results are obtained with toluene as an eluting solvent. For most purposes, the product is sufficiently pure for further reactions.

Typical Procedure for the Bromination of Phenyl-Containing Polymers

To a screw-cap jar with a Teflon®-lined lid is added a magnetic stir bar and then the polymer (5 grams). Methylene chloride (100 mL) is added and the polymer rapidly dissolves with stirring within 1 hour. After 19 hours, iron powder (Sigma-Aldrich catalog number 267953, consisting of particle sizes of less than 10-micrometers, 0.27 g) is added, and the stirring speed is adjusted and maintained to keep the iron powder dispersed throughout the liquid. When the appropriate stirring speed is achieved, the mixture appears gray. Bromine (between 3.4 and 5 g, accurately weighed by difference) is added, and the reaction mixture is stirred for 19 hours at 23° C. Sodium bisulfite (10 g) in water (90 g) is then added and the mixture turns from a yellow-red-brown color to white. The mixture is transferred to a separatory funnel and the aqueous layer is removed and discarded. The methylene chloride layer is washed with four, 100-mL portions of water and the methylene chloride layer is then pressure filtered through a 5-micron, Mitex® filter (Millipore). The methylene chloride layer is added portion-wise to methanol (2 L) using a Waring blender, and the coagulated polymer is isolated by filtration. The white, flocculated polymer is washed with three, 1-L portions of distilled water. Water washings are continued until the water filtrate no longer appeared cloudy. The polymer is then washed with methanol (2 L), and after drying under vacuum at 60° C., the polymer is then suitable to be used directly in the Ullmann coupling reaction, described below. The polymer is further purified by re-dissolving in methylene chloride at 10 wt. % solids, coagulation with methanol (2 L), isolation by filtration, and then vacuum drying at 60° C. The samples are subjected to EDS analysis to determine elemental composition, especially for % Br.

Preparation of Potassium Tetrafluoro-2-(tetrafluoro-2-iodoethoxy)ethanesulfonate, $ICF_2CF_2OCF_2CF_2SO_3^-K^+$ Tetrafluoro-2-(tetrafluoro-2-iodoethoxy)ethanesulfonyl fluoride (Magical Scientific, Oklahoma City) is hydrolyzed to potassium tetrafluoro-2-(tetrafluoro-2-iodoethoxy)ethanesulfonate as follows. To a 500-mL, Teflon®-lined screw cap jar with a magnetic stir bar is added tetrafluoro-2-(tetrafluoro-2-iodoethoxy)ethanesulfonyl fluoride (250.01 g), de-ionized water (82.42 g), methylene chloride (83 mL), distilled 2,6-lutidine (79.97 g), and 1-molar tetrabutylammonium fluoride (1.87 g). The mixture is magnetically stirred for four days, and then the aqueous layer is removed using a separatory funnel. The aqueous layer is extracted three times with methylene chloride (100-mL each time). The methylene chloride layers are combined in a 1-L, round-bottom flask and the volatiles are distilled off under vacuum with gentle heating (less than 50° C.). Tetrahydrofuran (500 mL) is added to the residue and anhydrous potassium carbonate (46.97 g, ground-up with a mortar and pestle) is added. The reaction mixture is magnetically stirred under argon for 10 hours at 23° C., and gas evolution is evident. The reaction mixture is pressure filtered though a 5-micrometer Mitex® filter (Millipore, 47 mm, LSWP) under nitrogen into a 1-L pear shaped flask and the solvent is removed under vacuum with gentle heating (less than 50° C.). The residue in 300-mL of a 1:1 mixture of tetrahydrofuran and toluene is heated with magnetic stirring on a hot plate until a solution is formed. On cooling, crystals form which are isolated by vacuum filtration and dried. A white soap-like solid is obtained and identified as crop 1 and is dried at 60° C. for 16 hours. Under vacuum, more crystals are formed in the filtrate, which are vacuum-filtered and identified as crop 2. Upon further evaporation of the filtrate under vacuum, more crystals are formed which are filtered. This third crop of off-white crystals is combined with the crop 2 crystals and then after another re-crystallization from a 1:1 mixture of toluene and tetrahydrofuran, a white soap-like solid is obtained. After drying at 60° C. overnight in a forced air oven, the white solid is used for the Ullmann coupling reaction.

Ullmann Coupling Reaction of Potassium Tetrafluoro-2-(tetrafluoro-2-iodoethoxy)ethanesulfonate with Brominated Polymers All reagents are dried under vacuum at 60° C. before use. To a 3-neck, 500-mL flask, equipped with a reflux condenser, argon inlet, and mechanical stirrer and situated in an oil bath, is added brominated polymer (10 g, 21.1 wt. % bromine, made by adding 8.0 g of $Br_2$ to 10 g polymer), dimethyl sulfoxide (20 mL, stored over 4 Å-molecular sieves), and N,N-dimethylformamide (80 mL, stored over 4 Å-molecular sieves). The mixture is heated in an oil bath set at 130° C., and the polymer starts to dissolve rapidly between 80 and 95° C. While the stirred solution is being heated in the oil bath at 130° C. under argon, copper powder (15.47 g, 45-micrometer particles, Acros 196575000) is rapidly added and the mixture is stirred for 2 hours. Potassium tetrafluoro-2-(tetrafluoro-2-iodoethoxy)ethanesulfonate (27.73 g) dissolved in N,N-dimethylformamide (100 mL) is then added drop-wise (at a rate of one drop every 3 to six seconds). Stirring under argon in the 130° C. oil bath is continued for 18 hours. The mixture is allowed to settle at 23° C., and the solvent layer is pressure-filtered through a 5-micrometer Mitex® filter. The filtrate is added to 1 liter of 10% hydrochloric acid (prepared by adding 100-mL of concentrated HCl to 900-mL, deioinzed water) using a Waring blender. The mixture is stirred 16 hours at 23° C., and then the polymer is collected by filtration, washed extensively with water (3 liters) using a Waring blender, filtered and dried in vacuo. The yield is about 14.0 g. The copper residue remaining in the flask after added washings with N,N-dimethylacetamide is found to contain an additional 0.5 g of polymer. The polymer dissolves in alcohols (ethanol, methanol, or isopropanol) and N,N-dimethyl-acetamide. The polymer as a 10 wt. % solution (usually in N,N-dimethylacetamide) is solution coated onto window-pane glass using a Bird applicator bar (with a 10-mil coating gap) and is then dried at 80° C. for 15 minutes. The film is floated off the glass with de-ionized water and is then boiled in 2-molar sulfuric acid for 1 hour. After extensive washing with de-ionized water (until the water washings are neutral), the film is air-dried and used as a polyelectrolyte membrane in a fuel cell. The membrane is further characterized as follows. Before titration, a sample of the membrane is heated using a hair-dryer for 70 seconds in a heated air stream at between 23 and 100° C. An accurately-weighed sample of membrane (usually punched out as a 4.5 cm×0.9 cm×0.0020 cm piece and weighing 0.0120 g) is placed in 50-mL water containing 1.0 g of sodium chloride and is titrated to pH 7 with standardized, 0.0100-molar sodium hydroxide. Another similar sample is boiled in water (100-mL) for 1 hour and the water uptake and volume swell are determined. A similar sample is placed in a Bektek, 4-point conductivity cell and proton conductivity is measured with percent relative humidity (between 20 and 100%) at 80° C. A dried sample, prepared the same as that used for titration, is subjected to EDX analysis to determine elemental composition. The samples prepared as described have an ion exchange capacity of about 1.3 milliequivalents of $H^+$ per gram, a water uptake of 645.5 wt. % (995.3 vol. %), and an elemental composition (by EDS) of 44.11% C; 13.31% O, 33.07% F, 1.24% Br, and 5.27% S. The proton conductivity (S/cm) versus percent relative humidity (in parentheses) at 80° C. is as follows: 0.005672 (20%), 0.01528 (30%), 0.03004 (40%), 0.04918 (50%), 0.07570 (60%), 0.1122 (70%), 0.1612 (80%), 0.2373 (90%), and 0.3187 S/cm (100%). When more than 30 wt. % bromine is attached to the polymer, cross-linking during the Ullmann coupling sometimes occurs.

Blends of Sulfonated Polymers with Kynar Rubber

A 30 wt. % Kynar blend is made as follows: A 10 wt. % solution of sulfonated polymer is made by dissolving 1 gram of polymer in 9 grams of N,N-dimethyl-acetamide. To this is added 2.857 grams of a 15 wt. % solution of Kynar 2751 in N,N-dimethylacetamide. The mixture is vigorously stirred and roll-milled for 1 hour before being pressure filtered through a 5 micrometer, Mitex® filter. The filtrate is placed in a centrifuge at 1000 rpms for ten minutes to remove air bubbles and then the solution is coated onto window pane glass using a Bird applicator bar with an 8-mil coating gap. The film is dried for 15 minutes at 80° C. and is then floated off the glass with de-ionized water. The 16-micrometer thick membrane is boiled for 1 hour in 2-molar sulfuric acid and then is extensively washed with water until the washings are neutral. The resulting membrane is evaluated as described above, except EDS is not routinely carried out on the Kynar blended samples. The membrane is also subjected to a relative humidity cycling test at 80° C. between 0 and 150% relative humidity over 2 minute intervals until 20,000 cycles are achieved or until a leak of 10 standard cubic centimeters at 10 psi is detected (which constitutes a test failure). A 40 wt. % Kynar blend is made by adding 4.444 grams of a 15 wt. % Kynar 2751 solution in N,N-dimethylacetamide to 10 grams of a 10 wt. % solution of the sulfonated-polymer in N,N-dimethylacetamide. The membrane is made as previously described.

Preparation of 11-Phenylundecene $[C_6H_5(CH_2)_9CH=CH_2]$ by the Reaction of Phenylmagnesium Chloride ($C_6H_5MgCl$) and 11-Bromoundecene with CuI Commercial 25 wt. % phenyl magnesium chloride (0.4 mol) in tetrahydrofuran (Acros Organics, AcroSeal bottle) works as described in the following reaction and is transferred to a 250-mL Schlenk flask equipped with a magnetic stirrer, reflux condenser, nitrogen inlet, and rubber septum side arm via cannula under nitrogen. Alternatively, the Grignard is made as follows. A 250 mL, 3-necked flask equipped with a mechanical stirrer, reflux condenser, addition funnel and argon inlet is situated first in a cooled water bath and then later in an oil bath. Under nitrogen, magnesium (0.04 mol) is added to chlorobenzene (0.04 mol) in dry tetrahydrofuran (freshly distilled from sodium benzophenone ketyl, 20 g), and is vigorously stirred for 3 hours. Undecylenyl bromide (0.04 mol) is added, and then CuI (0.02 mol) is added. After refluxing for 24 hours followed by cooling to 23° C., ammonium chloride is added and the solvent is removed. Water is added and the mixture is extracted with methylene chloride. After drying the methylene chloride layer over sodium sulfate and then filtration, the solvent is removed to yield a white crystalline solid and a light-yellow oil. The oil is decanted from the white solid (biphenyl) and then distilled at 150° C. under high vacuum to obtain 11-phenylundecene in 50% yield. By-products which distill over between 23° C. and 150° C. include phenol, undecene, 11-chloroundecene, biphenyl and 11-bromoundecene. Still bottoms remaining after the 11-phenylundecene has distilled over include $CH_2=CH-(CH_2)_{18}-CH=CH_2$. Without copper(I) iodide, no reaction takes place after 3 days of continuous reflux under the conditions described.

Ziegler-Natta Polymerization of 11-Phenylundecene

In a glove bag under nitrogen, 11-phenylundecene (4 g), toluene (50 mL), 25 wt. % diethyl aluminum chloride in toluene (10 mL) and titanium trichloride-aluminum chloride reduced (Aldrich, $TiCl_3.AA$, 0.5 teaspoon) are combined in a high-density polyethylene bottle. The lid of the bottle is secured and the bottle is placed on a roll mill for 16 h. The purple polymer solution/gel is added to methanol (2 L) using a Waring blender to chop up the precipitated polymer. The now white polymer is collected by filtration, washed with water (2 L) using a Waring blender and then with methanol (1 L). After vacuum drying, the poly(11-phenylundecene) becomes a white, sticky gum which dissolves in methylene chloride, tetrahydrofuran, and toluene.

Bromination of Poly(11-phenylundecene)

Isotactic poly(11-phenylundecene) (3.25 g) in methylene chloride (80 mL) is magnetically stirred with iron powder (0.13 g) and then bromine (2.2 g) is added. After 16 h of continued stirring, the solution is extracted with 10 wt. % sodium bisulfite (100 mL). The methylene chloride layer is washed with water and then filtered through a 5-μm Teflon filter. The filtrate is added to methanol (1 L) to precipitate a light-yellow polymer that is washed with water and then with methanol using a Waring blender. The vacuum-dried polymer is 22% bromine as determined with EDS.

Figure 4:
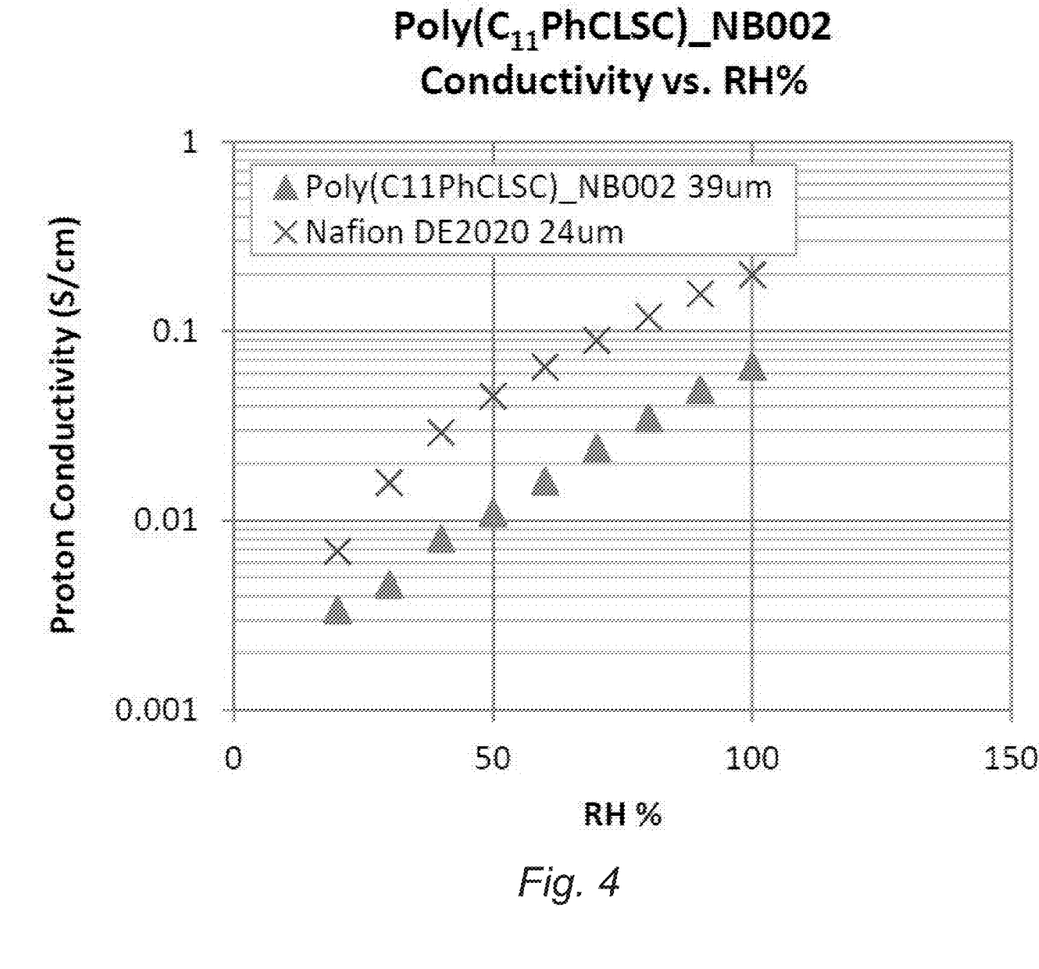
FIG. 4 provides plots of the proton conductivity of poly (11-phenylundecene with pendant perfluorosulfonic acid groups (39 micrometer thick, 1.2 meq $H^+$/g ion exchange capacity)
Figure 5:
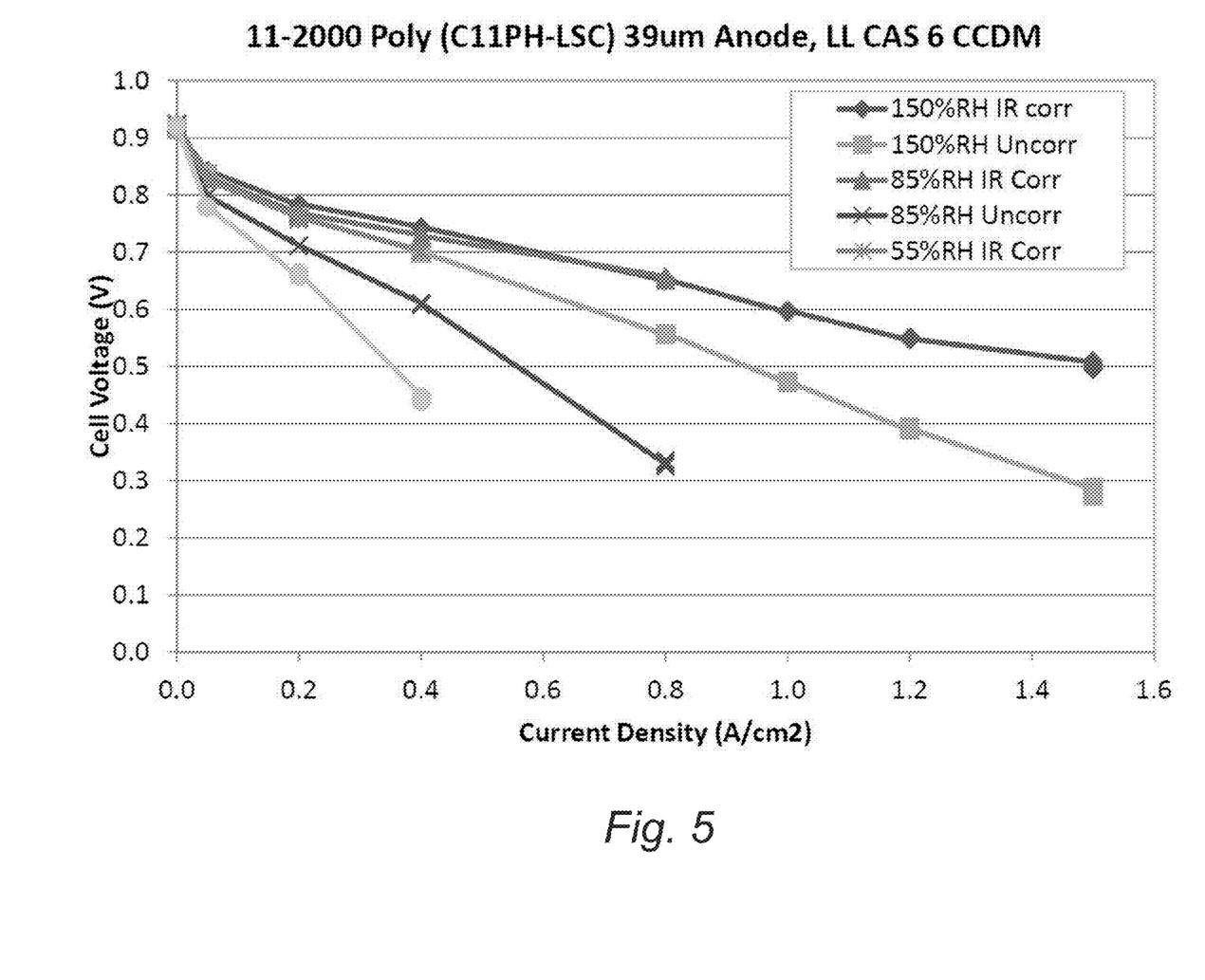
FIG. 5 provides a fuel cell polarization curve of poly(11-phenylundecene) with pendant perfluorosulfonic acid groups (39 micrometer thick, 1.2 meq $H^+$/g ion exchange capacity) wherein cell voltage (in Volts) is plotted versus current density (Amps/$cm^2$); the membrane was tested as a catalyst coated carbon fiber diffusion media (Mitsubishi Rayon Corporation) with 0.05 mg Pt/$cm^2$ on the anode and 0.4 mg Pt/$cm^2$ on the cathode; the relative humidities shown are for the cathode outlet gas streams.
Figure 6:
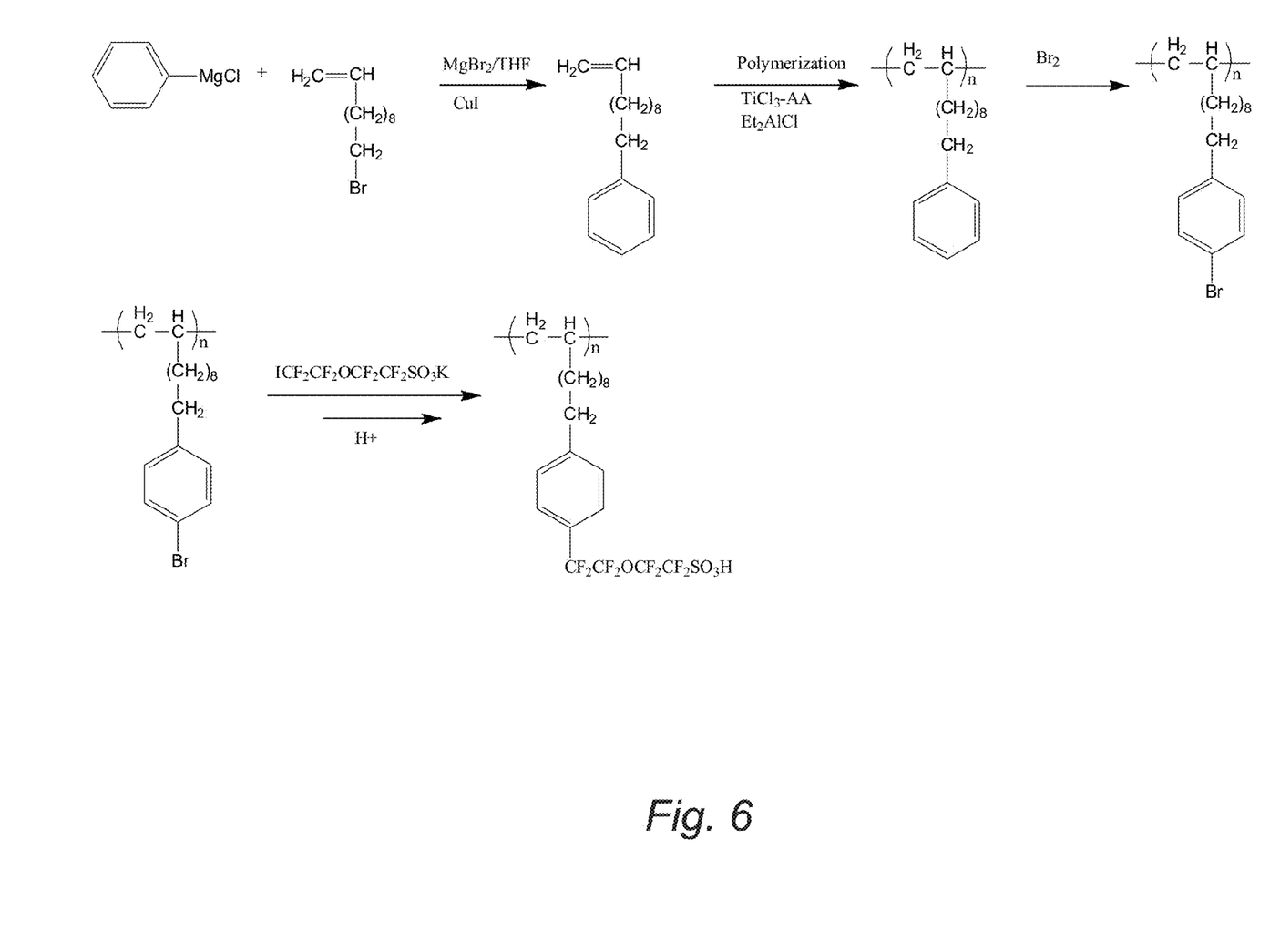
FIG. 6 provides schematics of the reaction pathway followed to prepare poly(11-phenylundecene) with pendant perfluorosulfonic acid groups.

Ullmann Copper Coupling Reaction of Poly(11-p-bromophenylundecene) and $ICF_2CF_2OCF_2CF_2SO_3^-K^+$ To a 3-neck, 250-mL flask, equipped with a reflux condenser, argon inlet, addition funnel and mechanical stirrer, and situated in an oil bath, is added poly(11-p-bromophenylundecene) (3 g, 22 wt. % bromine), dimethyl sulfoxide (30 g, stored over 4 Å-molecular sieves), and N,N-dimethylformamide (120 g, stored over 4 Å-molecular sieves). The mixture is heated in an oil bath set at 130° C., and when the reaction mixture is between 80 and 95° C., copper powder (6.27 g, 45-micrometer particles, Acros 196575000) is rapidly added and then the mixture is stirred for 1 hour at 130° C. Potassium tetrafluoro-2-(tetrafluoro-2-iodoethoxy)ethanesulfonate (13.6 g) dissolved in N,N-dimethylformamide (60 g) is then added drop-wise (at a rate of one drop every 3 to six seconds). Stirring under argon in the 130° C. oil bath is continued for 18 hours. The mixture is allowed to settle at 23° C. (with centrifugation), and the solvent layer is pressure-filtered through a 5-micrometer Mitex® filter. The filtrate is concentrated under vacuum using a rotary evaporator and is added to 1 L of 10% hydrochloric acid (prepared by adding 100-mL of concentrated HCl to 900-mL, deionized water) using a Waring blender. The mixture is stirred 16 hours at 23° C., and then the polymer is collected by filtration, washed extensively with water (3 liters) using a Waring blender, collected by filtration and dried in vacuo. The IEC of the ionomer ranged between 1.12 and 1.2 meq+/g. Unlike most sulfonated polyolefins, this ionomer is rubbery and not brittle. The polymer is then dissolved in N,N-dimethylacetamide and cast as a 39 micrometer thick membrane with Donaldson 1326 expanded polytetrafluoroethylene. The conductivity with percent relative humidity at 80° C. is shown in FIG. 4 and the fuel cell polarization curve of the membrane is shown in FIG. 5. The reaction scheme followed to make the polymer is shown in the scheme in FIG. 6.

Preparation of Poly(undecylenyl iodide)

The monomer is prepared from 11-undecylenyl iodide which is prepared by refluxing 11-undecylenylbromide (Acros Organics) in acetone with a 2-molar excess of sodium iodide for 1 week. The solvent is removed and the product is extracted from the residue with methylene chloride. After filtration and solvent removal, the 11-undecylenyl iodide is isolated by vacuum distillation and is obtained as a colorless liquid. The following Fuller et al. patents relate to functionalized polyolefins: U.S. Pat. Nos. 4,952,477; 4,990,424; 4,764,446; 5,030,535; 5,166,026; 5,409,796; 5,411,834; 5,451,483. Poly(1-olefins) can be made by several different routes, but the most common is by Ziegler-Natta polymerization, and more recently, by metathesis polymerization. Polyolefins with functional organic groups are made by direct polymerization of functionalized monomers or by the chemical modification of pre-formed polymers. The catalyst $TiCl_3.AA/Et_2AlCl$ is used to make isotactic poly-α-olefins that form α-helix structures. This catalyst can be used to polymerize ω-substituted α-olefins and the polymerization proceeds best with big, bulky groups that do not coordinate with the catalyst, e.g., $CH_2=CH-(CH_2)_n-CH_2-X$, which polymerizes best in the order where X=I then Br, then Cl. Carboxylic acid groups and alcohols are formed by protection with trimethylsilyl-groups [—$Si(CH_3)_3$], which are readily removed on work-up with aqueous acids. Nucleophic displacement of the halide ion can then be performed. In a glove bag under nitrogen, 11-undecylenyl iodide (10 g), toluene (50 mL), 25 wt. % diethyl aluminum chloride in toluene (10 mL) and titanium trichloride-aluminum chloride reduced (Aldrich, $TiCl_3.AA$, 0.5 teaspoon) are combined in a high-density polyethylene bottle. The lid of the bottle is secured and the bottle is placed on a roll mill for 16 h. The purple polymer solution/gel is added to methanol (2 L) using a Waring blender to chop up the precipitated polymer. The now white polymer is collected by filtration, washed with water (2 L) using a Waring blender and then with methanol (1 L). After vacuum drying, the poly(undecylenyl iodide) becomes a clear, colorless, sticky gum which dissolves in methylene chloride, tetrahydrofuran, and toluene.

Reaction of Poly(undecylenyl iodide) and Sodium p-Bromophenoxide

A 250-mL, 3-necked round bottom flask equipped with a mechanical stirrer, reflux condenser, and nitrogen inlet is charged with p-bromophenol (2 g, 0.0116 mol, Sigma-Aldrich, and purified by sublimation) and tetrahydrofuran (58 g, freshly distilled from sodium benzophenone ketyl). Sodium hydride (14 g of a 50 weight percent dispersion in oil, Sigma-Aldrich) is added with vigorous hydrogen gas evolution. A catalytic amount of 18-crown-6 (0.2 g) is added, and then a solution of poly(11-undecylenyl iodide) (2.58 g) in 50 g of freshly distilled tetrahydrofuran is added. The reaction mixture is stirred under nitrogen for 3 days and is then refluxed for 24 hours. The reaction mixture at 23° C. is cautiously treated with isopropanol to neutralize the unreacted sodium hydride. The reaction mixture is concentrated using a rotary evaporator and is then added to methanol (1 L) using a Waring blender. The solids are collected by filtration, washed with water, and then methanol (1 L) using a Waring blender. The resulting rubbery and tan-colored poly(11-p-bromophenoxyundecene) is isolated by filtration and vacuum dried. The polymer is 21.1 wt. % bromine as determined by EDS.

The Ullman Copper Coupling Reaction of Poly(11-p-bromophenoxyundecene) and $ICF_2CF_2OCF_2CF_2SO_3^-K^+$ To a 3-neck, 250-mL flask, equipped with a reflux condenser, argon inlet, addition funnel and mechanical stirrer and situated in an oil bath, is added poly(11-p-bromophenoxyundecene) (2 g, 21.1 wt. % bromine), dimethyl sulfoxide (20 mL, stored over 4 Å-molecular sieves), and N,N-dimethylformamide (80 mL, stored over 4 Å-molecular sieves). The mixture is heated in an oil bath set at 130° C., and when the reaction mixture is between 80 and 95° C., copper powder (3.09 g, 45-micrometer particles, Acros 196575000) is rapidly added and then the mixture is stirred for 1 hour at 130° C. Potassium tetrafluoro-2-(tetrafluoro-2-iodoethoxy)ethanesulfonate (5.55 g) dissolved in N,N-dimethylformamide (20 mL) is then added drop-wise (at a rate of one drop every 3 to six seconds). Stirring under argon in the 130° C. oil bath is continued for 18 hours. The mixture is allowed to settle at 23° C. (with centrifugation), and the solvent layer is pressure-filtered through a 5-micrometer Mitex® filter. The filtrate is added to 250 mL of 10% hydrochloric acid (prepared by adding 25-mL of concentrated HCl to 225-mL, deionzed water) using a Waring blender. The mixture is stirred 16 hours at 23° C., and then the polymer is collected by filtration, washed extensively with water (3 liters) using a Waring blender, collected by filtration and dried in vacuo. The polymer is then compression molded at 150° C. between two sheets of fluorinated ethylene polymer coated polyimide film at 350 psi. The resultant film is 3.9% S as determined using EDS. The ion exchange capacity of the tough and rubbery film is 1.2 meq $H^+/g$.

Polymerization of 4-Phenyl-1-butene

In a glove bag under nitrogen, 4-phenyl-1-butene (10 g), toluene (50 mL), 25 wt. % diethyl aluminum chloride in toluene (10 mL) and titanium trichloride-aluminum chloride reduced (Aldrich, $TiCl_3$·AA, 0.5 teaspoon) are combined in a high-density polyethylene bottle. The lid of the bottle is secured and the bottle is placed on a roll mill for 16 h. The purple polymer solution/gel is added to methanol (2 L) using a Waring blender to chop up the precipitated polymer. The now white polymer is collected by filtration, washed with water (2 L) using a Waring blender and then with methanol (1 L). After vacuum drying, the poly(4-phenyl-1-butene) is a white powder which dissolves in methylene chloride, tetrahydrofuran, and toluene.

Bromination of Poly(4-phenyl-1-butene)

Isotactic poly(4-phenyl-1-butene) (0.325 g) in methylene chloride (8 mL) is magnetically stirred with iron powder (0.013 g) and then bromine (0.22 g) is added. After 16 h of continued stirring, the solution is extracted with 10 wt. % sodium bisulfate (100 mL). The methylene chloride layer is washed with water and then filtered through a 5-μm Teflon filter. The filtrate is added to methanol (300 mL) to precipitate a white polymer that is washed with water and then with methanol using a Waring blender. The vacuum-dried polymer is 22.4% bromine as determined with EDS, which corresponds to about 1 bromo-group for every two repeat units. The expected % Br for the poly(4-phenyl-1-butene) having one Br per two repeat units is 23.3% Br.

Poly(4-phenyl-1-butene) with Pendant Perfluorosulfonic Acid Groups

Figure 7:
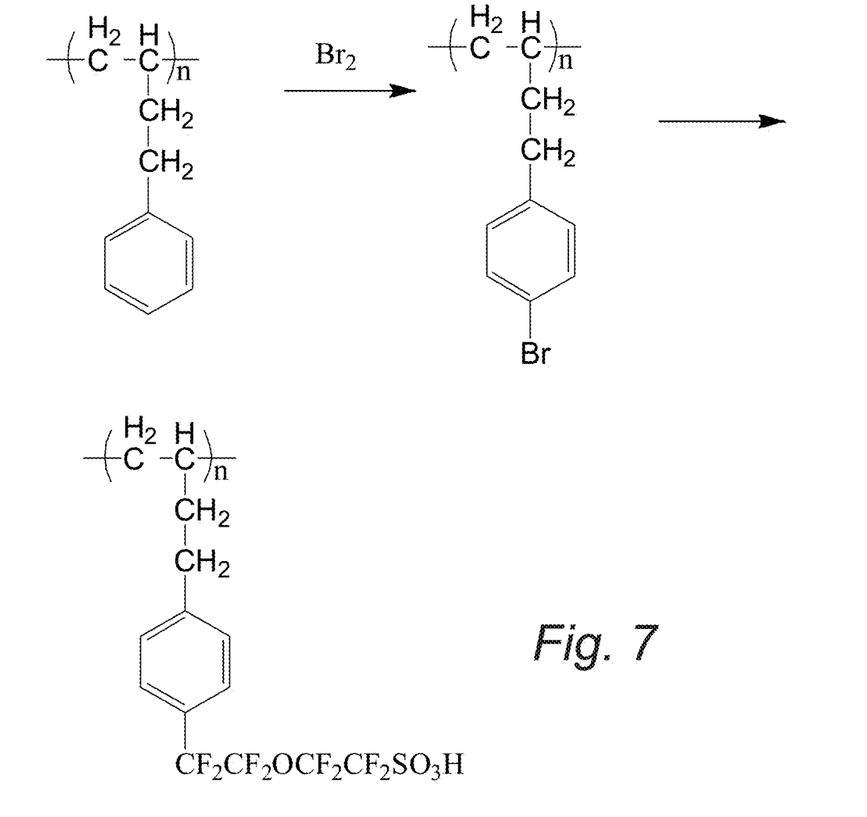
FIG. 7 provides schematics of the reaction pathways followed to make poly(4-phenyl-1-butene) with perfluorosulfonic acid pendant groups (3.59% S=1.12 IEC. from poly (bromo-4-phenyl-1-butene) with 22.41% Br)

To a 3-neck, 250-mL flask, equipped with a reflux condenser, argon inlet, addition funnel and mechanical stirrer and situated in an oil bath, is added poly(4-p-bromophenyl-1-butene) (0.2 g, 22.4 wt. % bromine), dimethyl sulfoxide (1.35 g, stored over 4 Å-molecular sieves), and N,N-dimethylformamide (5.5 g, stored over 4 Å-molecular sieves). The mixture is heated in an oil bath set at 130° C., and when the reaction mixture is between 80 and 95° C., copper powder (0.683 g, 45-micrometer particles, Acros 196575000) is rapidly added and then the mixture is stirred for 1 hour at 130° C. Potassium tetrafluoro-2-(tetrafluoro-2-iodoethoxy)ethanesulfonate (1.13 g) dissolved in N,N-dimethylformamide (3.3) is then added drop-wise (at a rate of one drop every 3 to six seconds). Stirring under argon in the 130° C. oil bath is continued for 18 hours. The polymer crashes out during and after complete addition. After stirring for 48 hours at 130° C., the polymer seems to re-dissolve. The mixture is allowed to settle at 23° C. (with centrifugation), and the solvent layer is pressure-filtered through a 5-micrometer Mitex® filter. The filtrate is concentrated under vacuum and 50 mL of conc. HCL in 200 mL water was added and the mixture is magnetically stirred until the big brown chunks break up. The mixture is stirred 16 hours at 23° C., and then the polymer is collected by filtration, washed extensively with water (3 liters) using a Waring blender, collected by filtration and dried in vacuo. The polymer is isolated by filtration, dried, re-dissolved in DMAc and coated into a membrane. The percent sulfur by EDS is 3.59% S which corresponds to an ion exchange capacity of 1.12 meq $H^+/g$. The polymer dissolves in N,N-dimethylacetamide from which membranes are coated onto window pane glass from a 10 wt. % solids solution using a Bird applicator bar with a 6-mil coating gap. Furthermore, blends with Kynar Flex 2751 are made at 11.11 wt. % solids in N,N-dimethylacetamide using the same 6-mil Bird applicator. Blends with 30 and 40 wt. % Kynar Flex 2751 (Arkema) are brittle, as is the base polymer with 0% Kynar Flex 2751. FIG. 7 provides a scheme for making poly(4-phenyl-1-butene) with perfluorosulfonic acid pendant groups.

Polystyrene with Pendant Perfluorosulfonic Acid Groups

Figure 8:
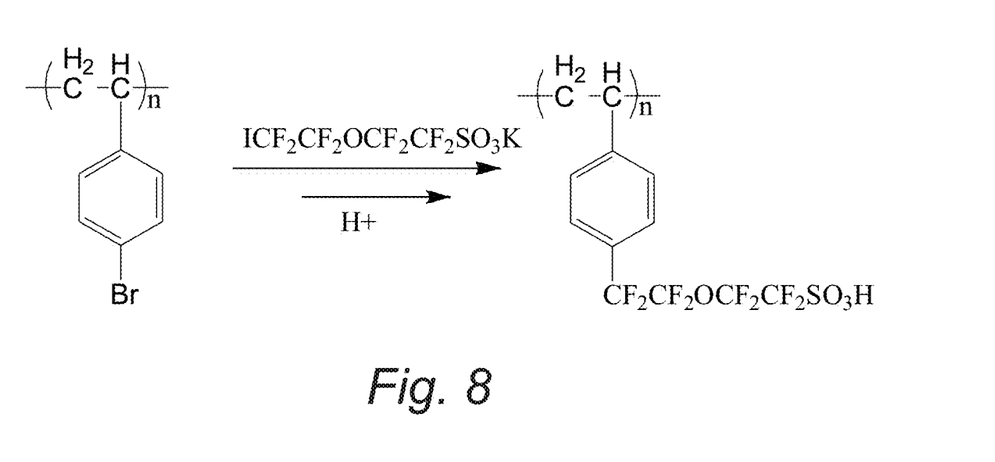
FIGS. 8 and 9 provide schematics of the reaction pathways followed to make polystyrene with perfluorosulfonic acid pendant groups (4.01% S=1.28 meq $H^+$/g ion exchange capacity).
Figure 9:
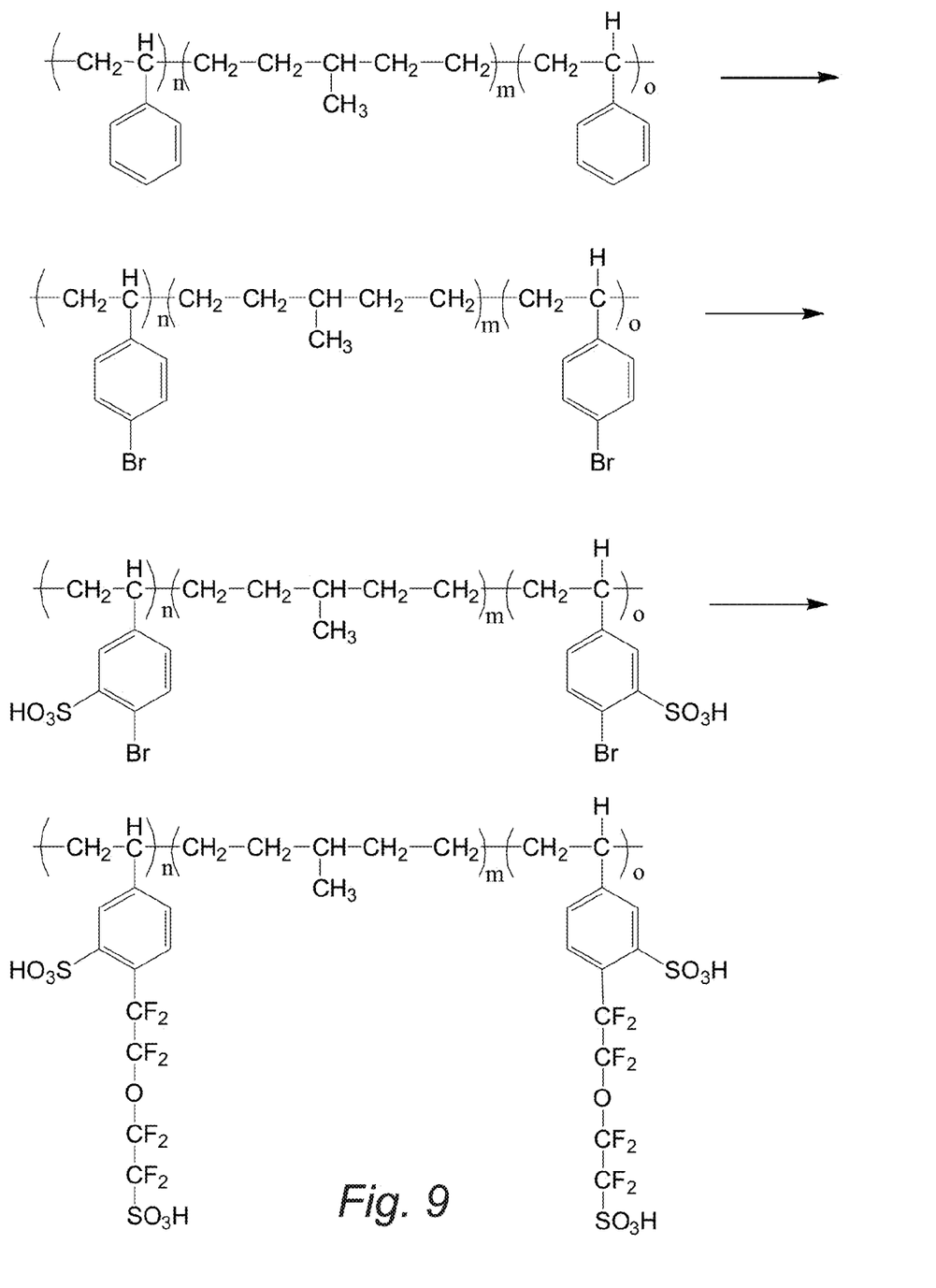

Brominated polystyrene is obtained from Scientific Polymer Products (Ontario, N.Y.). To a 3-neck, 250-mL flask, equipped with a reflux condenser, argon inlet, addition funnel and mechanical stirrer and situated in an oil bath, is added poly(4-bromopolystyrene) (1 g), dimethyl sulfoxide (4 g, stored over 4 Å-molecular sieves), and N,N-dimethylformamide (26 g, stored over 4 Å-molecular sieves). The mixture is heated in an oil bath set at 130° C., and when the reaction mixture is between 80 and 95° C., copper powder (2.09 g, 45-micrometer particles, Acros 196575000) is rapidly added and then the mixture is stirred for 1 hour at 130° C. Potassium tetrafluoro-2-(tetrafluoro-2-iodoethoxy)ethanesulfonate (4.54 g) dissolved in N,N-dimethylformamide (20 g) is then added drop-wise (at a rate of one drop every 3 to six seconds). Stirring under argon in the 130° C. oil bath is continued for 18 hours. The mixture is allowed to settle at 23° C. (with centrifugation), and the solvent layer is pressure-filtered through a 5-micrometer Mitex® filter. The filtrate is concentrated under vacuum and 25 mL of conc. HCL in 100 mL water is added and the mixture is magnetically stirred for 16 hours at 23° C., and then the polymer is collected by filtration, washed extensively with water (3 liters) using a Waring blender, collected by filtration and dried in vacuo. The polymer is isolated by filtration, dried, re-dissolved in DMAc and coated into a membrane. The percent sulfur by EDS is 4.01% S which corresponds to an ion exchange capacity of 1.28 meq $H^+/g$. The polymer dissolves in N,N-dimethylacetamide from which membranes are coated onto window pane glass from a 10 wt. % solids solution using a Bird applicator bar with a 6-mil coating gap. Blends with 30 and 40% Kynar Flex 2751 are made at 11.11 wt. % solids in N,N-dimethylacetamide using a 6-mil Bird applicator. Membranes with 0, 30 and 40 wt. % Kynar Flex 2751 (Arkema) are brittle. FIG. 8 provides reaction pathways followed to make polystyrene with perfluorosulfonic acid pendant groups. With reference to FIG. 9, Kraton rubber is first brominated and then is sulfonated with Acetic anhydride and sulfuric acid in methylene chloride. Mild main chain sulfonation is reuired to impart solubility of the brominated Kraton in N,N-dimethylacetamide. The bromo groups are then replaced with perfluorosulfonic acid groups as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming an ion conducting polymeric membrane for fuel cells, the method comprising:

a) reacting a polymer having formula 1 with a compound having formula 2

(1)

$$X_2-R_5-SO_3Z \quad (2)$$

in the presence of an organocuprate compound to form a polymer having formula (3):

(3)

wherein:
$X_1$, $X_2$ are each independently a halogen;
$R_1$, $R_2$, and $R_3$ are each independently hydrogen or $C_1$-$C_6$ alkyl;
$R_4$, $R_5$ are each independently phenyl, $C_1$-$C_{12}$ alkyl, $C_1$-$C_{12}$ alkyl ether, $C_1$-$C_{12}$ fluoroalkyl, $C_1$-$C_{12}$ fluoroalkyl ether, $C_7$-$C_{30}$ arylalkyl, $C_7$-$C_{30}$ phenylalkyl, $C_7$-$C_{12}$ aryl, —$(CH_2)_r$— or —$(CF_2)_p$—O—$(CF_2)_q$—;
Z is hydrogen or a metal;
n is a number from 10 to 500; and
p, q, r are each independently an integer from 2 to 10; and b) forming a membrane from the polymer having formula (3).

2. The method of claim 1 wherein the organocuprate compound is formed via the reaction of alkyl lithium with copper (I) iodide via the following synthetic scheme:

wherein R is $C_1$-$C_{12}$ alkyl.

3. The method of claim 1 wherein $R_4$ is —$(CH_2)_t$— and t is an integer from 1 to 12.

4. The method of claim 1 wherein $R_4$ is v is an integer from 0 to 12, and w is an integer from 0 to 12.

5. The method of claim 1 wherein $R_5$ is —$(CF_2)_p$—O—$(CF_2)_q$— or —$(CH_2)$.

6. The method of claim 1 wherein $R_5$ is —$CF_2 CF_2$—O—$CF_2 CF_2$—.

7. The method of claim 1 wherein the membrane is formed by melt casting, spin coating, solution casting, extrusion casting, calendaring, spray coating, blow molding, fixed gap coating, or hot pressing and the like.

8. The method of claim 1 wherein the thickness of the membrane is from 2 micrometers to about 200 micrometers.

9. The method of claim 1 further comprising positioning the membrane between an anode layer and a cathode layer.

* * * * *